Jan. 19, 1954     F. E. BACHMAN     2,666,506
BRAKE HEAD BALANCING DEVICE
Filed May 24, 1949
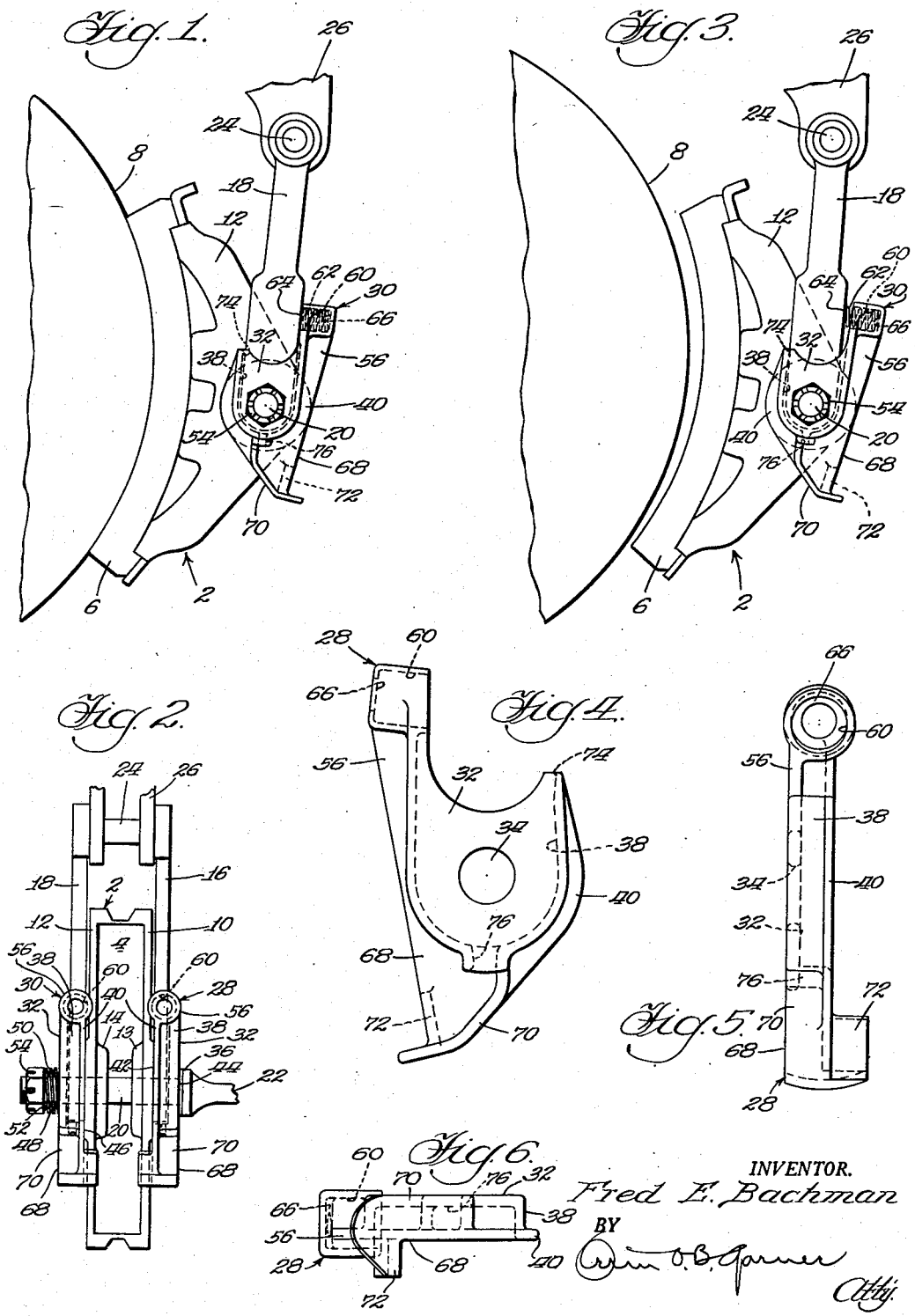
INVENTOR.
Fred E. Bachman Patented Jan. 19, 1954

2,666,506

UNITED STATES PATENT OFFICE 2,666,506

BRAKE HEAD BALANCING DEVICE

Fred E. Bachman, St. Louis, Mo., assignor to American Steel Foundries, Chicago, Ill., a corporation of New Jersey Application May 24, 1949, Serial No. 95,030

8 Claims. (Cl. 188—206)

This invention relates to railway brake equipment and more particularly to brake head balancing devices for use on clasp brakes.

An object of the invention is to provide an automatically adjustable brake head balancing device for clasp brake rigging.

Another object of the invention is to provide a brake rigging incorporating balancing means for controlling and limiting movement of the brake head assemblies, upon release of the rigging, to prevent the assemblies from dragging on the vehicle wheels.

A more specific object is to provide a brake head balancing device incorporating stop means engageable with the head for positively limiting rotation of the head on its supporting pivot element in a direction causing the upper end of the shoe to drag on the wheel.

The invention contemplates the use of friction means to resist rotation of the brake head assembly and the use of stop means for positively restricting rotation of the assembly within certain specified limits.

These and other objects of the invention will become more apparent from the specification and the drawings, wherein:

Figure 1 is a side elevational view of a brake arrangement incorporating the invention;

Figure 2 is an end view taken from the right as seen in Figure 1;

Figure 3 is a view comparable to Figure 1 showing the parts in released position; and Figures 4 to 6 illustrate a friction member, Figure 4 being a side elevational view thereof, Figure 5 an end view taken from the right as seen in Figure 4, and Figure 6 a bottom view thereof.

Describing the invention in detail, the arrangement comprises a brake head, generally designated 2, including a transverse wall 4 formed and arranged to afford a conventional support for a brake shoe 6 engageable with the tread of the associated wheel 8. The wall 4 is integrally formed with spaced inboard and outboard side walls 10 and 12, the side walls being provided centrally thereof with bearing portions 13 and 14 aligned transversely of the brake head.

The brake head walls 10 and 12 are received between a pair of spaced inboard and outboard hangers 16 and 18, and the head is connected to the hangers by a trunnion 20 of a brake beam 22, the trunnion extending through aligned openings in the lower ends of the hangers and through the bearing portions 13 and 14. The upper ends of the hangers are pivotally connected as at 24 to a support structure 26 which is preferably part of the truck frame. The assembly is actuated to applied and released positions by conventional rigging (not shown) connected to the beam as will be readily understood by those skilled in the art.

Automatically adjustable brake head balancing means are provided to control rotation of the head to prevent the upper end of the shoe 6 from engaging on the tread of wheel 8 in the released position of the rigging.

The balancing means comprises right- and left-hand members 28 and 30 disposed inboardly and outboardly of hangers 16 and 18, respectively. Each member 28 and 30 comprises a body portion 32 intermediate its ends. The body portion of each member 28 and 30 is provided with a transverse opening 34 by means of which it is sleeved onto the trunnion 20.

The body portion of member 28 is disposed between the hanger 16 and a shoulder 36 on the beam at the inboard end of the trunnion.

The body portion of member 30 is mounted on the trunnion 20 adjacent its outer end outboardly of the hanger 18.

Each body portion 32 is provided with a transverse peripheral U-shaped web 38 extending around the lateral edges and bottom end of the adjacent hanger in predetermined spaced relationship thereto. The edge of the web 38 remote from the associated body portion is provided with an outturned flange 40.

Flange 40 of member 28 frictionally engages as at 42 the external side of brake head wall 10 while the body portion 32 of said member frictionally engages as at 44 the shoulder 36 of the beam.

Similarly, flange 40 of member 30 engages the external side of the brake head wall 12 as at 46 and the body portion 32 of member 30 affords a seat as at 48 for the inner end of a compression spring 50 sleeved over the trunnion 20 and seated at its outer end as at 52 against the inner face of a nut 54 threaded on the trunnion. Rotation of the nut varies the compression of the spring 50 which maintains the members 28 and 30 in engagement with the parts heretofore described.

The body portion 32 of each member 28 and 30 is provided with an upper arm 56 formed as a continuation thereof and of the associated web 38 and flange 40 and extending adjacent the rear edge of the related hanger. The upper end of arm 56 is provided with a pocket 60 housing a spring 62 compressed between the rear edge of the related hanger as at 64 and a spring seat 66 within the pocket.

The body portion 32 of each member 28 and 30 is also provided with a lower arm 68 formed as a continuation of the flange 40. The arm 68 is integrally formed with a transverse web or rib 70 which extends diagonally with respect to the vertical axial plane of the associated member along its lower edge and merges at its upper end with web 38. The lower end of web 70 extends beyond the rear edge of arm 68 and together with arm 68 merges with a lug 72 which extends transversely behind the brake head for engagement with the rear edge of the adjacent brake head wall below the axis of rotation of the brake head.

In operation of the device, the hanger pivots at 24 when the brake is applied, the bottom of the shoe contacting the wheel first. Continued brake application forces the shoe into braking contact with the periphery of wheel 8, causing pivotal movement of the head with the friction arms as a unit on trunnion 20 relative to the hangers. This movement compresses the springs 62 against the backs of the hangers, which upon release of the brake system, causes the head and shoe to rotate in a clockwise direction (Figure 1) until the stop or abutment 74 afforded by the web 38 of each member 28 and 30 engages with the front edge of the related hanger as in Figure 3.

It will be appreciated that under service conditions, the brake equipment is subjected to continuous vibration and shocks such as may overcome the frictional resistance developed between the friction members 28 and 30 and the brake head walls so that the head is caused to rotate in a counterclockwise direction (Figure 1). In such event the rear edges of the brake head walls engage the stop lugs 72 on members 28 and 30 before the upper end of the head drags on the wheel. It will be noted that the engagement between the brake head walls and the stop lugs 72 is cushioned by the action of springs 62.

The balancing means is self-adjusting. As the shoe or wheel wears, the rotation of the head during braking application becomes greater than the clearance between the hangers and faces of the friction arm spring pockets 60 which act as stops, or abutments upon further rotation of the head, said abutments engage the rear faces of the hangers restraining further movement of the friction members and causing an adjusting movement between the friction members 28 and 30 and the head, the head having an independent movement relative to the members 28 and 30 by overcoming the frictional resistance between the friction members and the head as applied by spring 50.

On release of the rigging, the parts, as adjusted, will assume similar relative positions so that the springs 62 will function to return the head to a position to prevent dragging of upper edge of the shoe on the wheel.

To prevent malfunctioning of the balancing means by accumulation of dirt between the head, hangers, and the friction member, the web 38 of each member is provided with a drain opening 76 at the bottom of the body portion.

It will be noted that the arms 56 and 68 are disposed at the same side of the axis of pivot of the associated member 28 or 30 and that the stops 74 are disposed at the opposite sides of said axis.

I claim:
1. A friction member for brake rigging described in its normal position with respect to the rigging, comprising a substantially vertical body portion with an opening therethrough accommodating mounting and rotation of said member on an axis extending transversely thereof, a U-shaped web integral with the inner side of said body portion and extending transversely thereof, said web being provided with a drain opening at the bottom of the U, an outturned flange on the edge of said web remote from said body portion, said member being provided with upper and lower arms at one side of said axis, the upper arm being formed as a continuation of said web, flanges and body portion and having a spring pocket at its upper end open at the end thereof adjacent said axis, said lower arm being formed as a continuation of said flange, a rib formed integral with the external side of the portion of said flange forming said lower arm and extending diagonally with respect to a vertical axial plane of said member along the lower edge of said lower arm and at its upper extremity extending substantially vertically and merging with the underside of said U-shaped web, said rib extending at its lower end beyond the edge of said lower arm remote from said side of said axis and together with the portion of said flange forming said lower arm, and a stop lug extending from the inner side of said lower arm transversely thereof.

2. In combination, a wheel, a brake head assembly comprising a brake head carrying a shoe on its forward side engageable with the tread of the wheel, a support for moving said assembly for engaging and disengaging the shoe with the tread of the wheel, means connecting said support and head including friction means for resisting pivotal movement of said head relative to said support except when the shoe is applied to said tread, said friction means including upper and lower arms, the upper arm extending along the side of said support remote from said wheel, resilient means compressed between said upper arm and said side of said support for rotating said head with said friction means as a unit a limited amount in a direction moving the upper end of said assembly away from said tread when said shoe is disengaged from said tread, and stop means carried by said lower arm for engagement with the rear side of said head below the axis of rotation of said assembly for limiting rotation of said assembly in a direction moving the upper end thereof toward said tread.

3. In combination, a brake head, a hanger, pivot means securing said hanger to said head, a friction member pivoted on said pivot means, resilient means carried by said pivot means for urging said member into frictional engagement with said head whereby said member and head are rotatable as a unit, said member clearing said hanger to accommodate limited rotation of said member and head relative to said hanger, spring means disposed above the axis of rotation of said head and member and compressed between said member and a side of said hanger remote from said head for rotating said member and head in a direction moving the upper end of said head toward said hanger, and stop means on said member engageable with the back of said head below said axis for limiting rotation of said head relative to said member and hanger in a direction moving the upper end of said head away from said hanger.

4. In combination, a wheel, a brake head having a shoe engageable with said wheel, hangers pivotally connected to said head for support thereof, friction means for effecting a frictional connection between said head and hangers to resist pivotal movement therebetween, said friction means being loosely interlocked with the hangers and rotatable with said head a limited amount in either direction on the axis of pivot of the head and hangers and comprising stop means disposed at one side and above the axis of pivot of said head and hangers and engageable with said hangers for limiting said movement of said friction means with said head relative to said hangers in one direction, said friction means comprising stop means disposed below and at the opposite side of said axis and engageable with said head for limiting pivotal movement of said head relative to said hangers and said friction means in the opposite direction.

5. A friction member for brake rigging, comprising a body portion, a transverse U-shaped web on the inner side of said body portion, an outturned flange on the edge of said web remote from said body portion and presenting a friction surface for engagement with an associated brake head, said body portion having an opening accommodating mounting and rotation of said member on an axis extending transversely thereof, oppositely extending arms integral with said body portion disposed at one side of said axis, one of said arms being formed as a continuation of said body portion and the adjacent sections of said web and flange and having a spring pocket, the other arm being formed as a continuation of said flange and presenting a friction surface coplanar with the first-mentioned surface for engagement with an associated head, and a transverse stop lug on the inner side of said last-mentioned arm.

6. In a brake arrangement, a wheel, a brake head assembly adapted for braking engagement with the wheel, a support, pivot means rotatably connecting said assembly with said support, friction means for controlling the rotation of said assembly with respect to the support and including stop means disposed below the axis of pivot of said assembly and engageable therewith to limit rotation of said assembly in a direction moving the upper end of said assembly toward the wheel, and yielding means reacting between said support and friction means above said axis in opposition of said direction of movement of said assembly to afford a yieldable action for said stop means upon engagement of said assembly therewith.

7. In a brake arrangement, the combination of a brake head, a support therefor, means pivotally connecting said head and support and including friction means engaging the head for frictionally resisting rotation of said head relative to said support and loosely interlocked with said support for rotation on said first-mentioned means with respect to the support, resilient means reacting between said friction means and said support for rotating said friction means together with the head in one direction as a unit with respect to said support under certain conditions, and stop means on said friction means adapted for abutment with said head for limiting rotation of said head with respect to said support in the opposite direction.

8. A friction member for brake rigging comprising a body portion including a peripheral web adapted to embrace a portion of a brake hanger, said body portion having an opening accommodating mounting of said member on a pivot element and rotation thereof on an axis extending transversely of said member, said body portion being provided with upper and lower arms at one side of said axis, a stop lug on said lower arm, and a spring pocket on said upper arm, said web being provided with a stop portion at the opposite side of said axis adapted to abut said hanger.

FRED E. BACHMAN.

References Cited in the file of this patent

UNITED STATES PATENTS

| Number | Name | Date |
|---|---|---|
| 1,269,257 | Burton | June 11, 1918 |
| 2,043,693 | Baselt | June 9, 1936 |
| 2,394,382 | Holin | Feb. 5, 1946 |